United States Patent
Belleville et al.

(10) Patent No.: US 6,579,477 B1
(45) Date of Patent: Jun. 17, 2003

(54) METHOD FOR MAKING OPTICAL COMPONENTS BY REPLICATION

(75) Inventors: Philippe Belleville, Tours (FR); Philippe Gacoin, Gif/Yvette (FR); Sophie Kaladgew, St Georges (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/719,060

(22) PCT Filed: Jun. 8, 1999

(86) PCT No.: PCT/FR99/01348

§ 371 (c)(1),
(2), (4) Date: Dec. 7, 2000

(87) PCT Pub. No.: WO99/64901

PCT Pub. Date: Dec. 16, 1999

(30) Foreign Application Priority Data

Jun. 9, 1998 (FR) .............................. 98 07218

(51) Int. Cl.⁷ ................................. B29D 11/00
(52) U.S. Cl. ............................................ 264/1.7
(58) Field of Search .................. 264/1.7, 2.5, 2.7, 264/259; 365/124, 125; 359/566; 15/209, 219, 322

(56) References Cited

U.S. PATENT DOCUMENTS 4,235,654 A  * 11/1980 Dohi et al. ................. 156/102

FOREIGN PATENT DOCUMENTS

| EP | 0332790 A1 | 9/1989 | ............ G02B/5/18 |
|---|---|---|---|
| JP | 59065810 | 4/1984 | ............ G02B/5/18 |
| JP | 07261010 | 10/1995 | ............ G02B/5/18 |

OTHER PUBLICATIONS

New Journal of Chemistry, vol. 18, Oct. 1994; "Organic–Inorganic Nanocomposites for Micro Optical Applications," By H.Krug and H. Schmidt, Institut for Neue Materialien, im Stadtwald, Gebaude 43, 66123 Saarbrucken, Germany, pp. 1125–1134.

Journal of Non–Crystalline Solids 169 (1994), pp. 207–209; Letter to the Editor "Evaluation of SiO2 Thin Films Prepared by Sol–gel Method Using Photoirradiation" By S. Maekawa* & T. Oshishi. *Corresponding author.

* cited by examiner

Primary Examiner—Michael W. Ball
Assistant Examiner—Barbara J. Musser
(74) Attorney, Agent, or Firm—Hayes Soloway P.C.

(57) ABSTRACT

A method for fabricating optical components by replication using a matrix, and optical components obtained by such method are described. The optical components are diffractive optical components, such as light-diffraction networks which are used in optical devices in order to divert a light beam according to a preferential order of diffraction.

19 Claims, 1 Drawing Sheet

METHOD FOR MAKING OPTICAL COMPONENTS BY REPLICATION

DESCRIPTION

Figure 1:
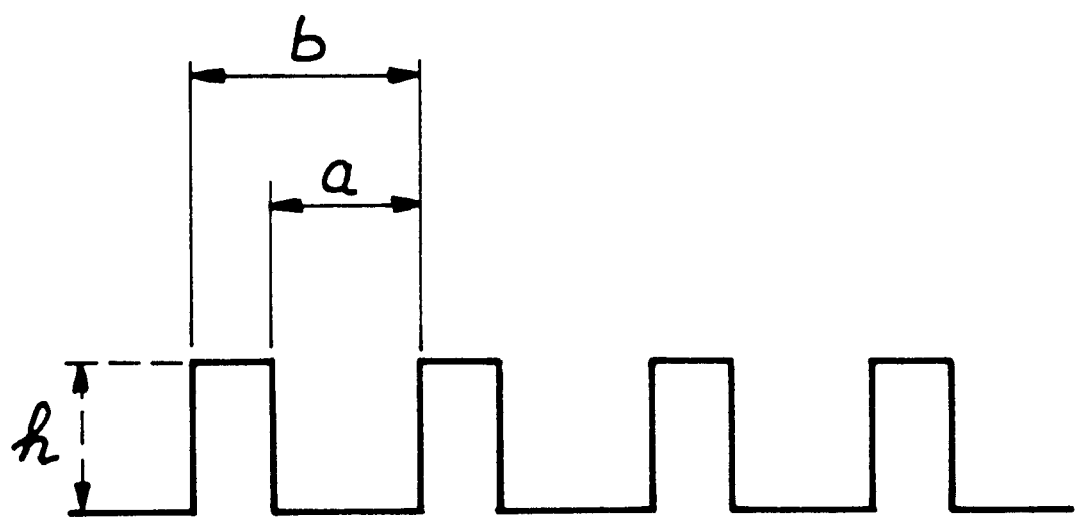

This invention relates to a method for fabricating optical components by replication using a matrix.

The invention also concerns the optical components obtained with this method.

These optical components are in particular diffractive optical components, such as light-diffraction networks which are used in optical devices in order to divert a light beam according to a preferential order of diffraction.

The diffraction components are in particular used in laser systems, in which the diffraction network can fulfil several functions such as deviation, chromatic separation and optionally focalisation, passing through a minimum amount of material; in this respect, reference may be made to French patent application n° 96 11378 relating to a focalising diffraction network of very great efficiency.

FIG. 1 gives a cross-section diagram of a conventional diffraction network.

This network 1 has an etching profile formed of a succession of elementary etched patterns which are for example in crenate form.

The efficacy of said component relates essentially to the characteristics of the etching profile.

These characteristics are:

the depth h of etching of the material forming the network, this depth may be optimized in order to achieve maximum diffraction efficiency;

spacing a;

the step or period b;

the "filling rate" t, which is defined by the ratio $$t = \frac{(b-a)}{b}$$

which is less than 1; the optimal depth to be given to etchings is also dependent upon this filling rate;

the "aspect ratio" r which is defined as the ratio $$r = \frac{(b-a)}{h}.$$

The greater the depth, the smaller the aspect ratio (r<1) but in this case the term profile with a high aspect ratio is used, since reasoning is made with reference to a unit profile width (b-a): for example, in the following, an aspect ratio of 1:1 is easy to replicate, while an aspect ratio of 1:5 is difficult to replicate.

Evidently, as a general rule an accurate replication method must be able to provide replicated objects or copies having the same characteristics as the master object or matrix.

This requirement has to be fulfilled for the fabrication by replication of optical components, and more particularly diffractive optical components.

Therefore, for a diffraction network, the method of fabricating such a network by replication must ensure exact reproduction of the copied etching profile, that is to say it must transpose with the highest fidelity the characteristics of the above-defined etching profile, namely, depth, spacing, period, filling rate, and aspect ratio.

The accuracy with which the characteristics of the copied profile are reproduced determines the optical properties, diffraction efficiency in particular, which must be similar to those of the master.

Also, the material used to produce the replica must have the required properties for the desired application, for example in a laser system.

The replication methods described in the literature may be classified into three main categories, namely hot embossing, injection moulding and casting.

The embossing method is a technology widely used in the hologram production industry, in particular as described in the document by Kluepfel et al., 1991, Holography Market Place, Berkeley, Calif. USA, Ross Books.

This technique is based on the principle consisting of pressing a thermoplastic material such as polyvinyl chloride or polycarbonate, that is heated, onto a planar carrier using a matrix.

This technique is particularly suitable for reproducing profiles having a depth of less than 1 $\mu$m, or deeper but with a low aspect ratio, that is to say r is greater than 1.

However, the document by Knope and Gale 1980, Surface-Relief Images for Colour Reproduction, London, Focal Press, describes the replication using a laboratory method of networks having an aspect ratio of 1/4.3.

The document by Becker et al., 1986, LIGA Process, Microelectronic Engineering 4, 35–36 describes a technology intended for the replication, by embossing, of microstructures having a high aspect profile.

The second major category of replication methods is the moulding category, which was mass developed for the production of Fresnel lenses as described in the document by Miller et al., 1951, JOSA, 41, 807–815, of condensers for overhead projectors, or audio or video compact disks as described in the document by Teyssier et al., 1990, Lasers & Optronics, December 1990, 50–53.

With this method it is possible, by injecting under pressure a softened plastic material such as a polycarbonate, polymethyl acrylate or other into a profiled mould, to accurately reproduce a microstructure.

Nonetheless, the industrial production of replicas of high resolution, that is to say much less than 1 $\mu$m, and of great depth, that is to say greater than 1 $\mu$m, has not been achieved simultaneously.

Finally, the casting replication method, as described for example in the document by Hutley 1982, Diffraction Gratings, 125–127, Academic Press, London, consists of the application of a material to the surface of a profiled matrix and its temperature-assisted forming (casting), or by photo-polymerization as indicated in the documents by Coops, 1990, Philips J. Res, 44, 481–500 and by Shvartsman, 1993, SPIE Critical Review Proceedings, CR49, 117–137, SPIE, WA., USA.

This method particularly applies when high resolution profiles are needed and a high aspect ratio. However, cycle times are long.

Also, sol-gel, non-plastic, materials have been used to prepare diffractive optics or waveguides by the INM institute (Institut für neue Materialien) in Sarrebrück.

Therefore, the document by Krug et al., 1994, New J. Chem. 18, 1125–1134 describes experiments using embossing and UV photo-crosslinking of the hybrid material $Zr(OR)_4/CH_2=CCH_3COOH/(RO)_3Si(CH_2)_3OCOC(CH_3)=CH_2$ to replicate transmission diffractive networks in the visible region or near-infrared.

None of the above-described processes meets simultaneously all the requirements mentioned above for a method to fabricate an optic component, such as a diffractive network, by replication, that is to say an accurate, exact reproduction of the etching profile defined by the above-mentioned characteristics and having optic and other properties required for the desired application such as transmission (clarity), plasticity . . .

In particular, none of the methods of the prior art provides a simple way to accurately replicate matrices of high density and with a high aspect profile.

Also, none of the methods of the prior art, other than the requirements already mentioned, is able to meet the additional constraints encountered in power lasers.

These lasers, whose future generation will for example have a power of 500 TW at 0.35 µm, require the use of large-size diffraction networks, for example 400 by 440 mm, having high efficiency and above all strong resistance to the laser flow in a region possibly ranging for example from the near-ultraviolet to the near-infrared.

A need therefore exists for a method to produce optical components by replication which simultaneously meets all the requirements and constraints described above.

A need particularly exists for a method providing a simple way to accurately replicate matrices having a high density and high aspect ratio.

A further need also exists for a method with which it is also possible to prepare optical components such as diffraction networks of large size.

Finally the need exists for a method with which it is possible to accurately replicate optical components, irrespective of the copy material and in particular with copy materials having all the optical and other (mechanical, thermal . . . ) properties required for the desired application and, among other properties, excellent resistance to laser flow.

Moreover, this method must be simple, reliable, easy to implement, and low cost.

The purpose of the invention is, among others, to meet these needs.

The purpose of the invention is also to provide a method for fabricating optical components by replication which does not have the disadvantages, defects and limitations of the methods of the prior art, and which solves the problems raised by the prior art.

This purpose, and others, are reached according to the invention with a method for fabricating an optical component by replication using a matrix, in which firstly, and in order to treat the matrix:

a release agent is applied to the cleaned matrix using a liquid phase depositing technique, the matrix coated with the release agent is subjected to heat treatment;

and secondly, in order to prepare a copy carrier:

an adhesion promoter or coupling agent is applied to a cleaned substrate using a liquid phase depositing technique;

the substrate coated with adhesion promoter or coupling agent is subjected to heat treatment;

in order to complete either the treatment of the matrix or the preparation of the copy carrier, a copy material is applied by a liquid phase depositing technique either onto said heat-treated matrix coated with the release agent, or onto said heat-treated substrate coated with adhesion promoter or coupling agent, and said matrix or said substrate coated with copy material is subjected to heat treatment;

the matrix so treated and the copy substrate so prepared are brought to embossing temperature separately;

the matrix and the copy carrier are assembled and either the matrix is embossed onto the copy carrier or the copy carrier is embossed onto the matrix;

the assembly temperature and pressure are maintained for a sufficient time interval to ensure replication;

after cooling, the copy carrier carrying the replicated optical component is separated from the matrix.

The method of the invention remedies the disadvantages of the methods of the prior art, brings a solution to the problems raised by these methods and meets all the above-mentioned requirements.

The method of the invention simultaneously meets all the criteria set forth and can be used to control the fabrication of an optical component in a suitable material having all desired optical and other properties, such as clarity, plasticity and resistance to laser flow, without it undergoing any damage during the implementation steps, and finally ensures an accurate, hitherto unsurpassed reproduction of the matrix irrespective of its nature and its etching depth.

In other words, with the method of the invention it is possible, in surprising manner, to obtain accurate replication of any profile, while making this accurate replication possible with copy materials having all the required properties for implementation in all optical components.

The method of the invention, which is very simple and largely reliable, comprises a limited number of steps involving proven depositing techniques and known compounds that are easily available.

In addition, the method is relatively little time-consuming, and as a result the method of the invention is also advantageous in terms of cost.

The method of the invention applies to the fabrication of any optical component irrespective of its nature, but it is advantageously used to produce diffractive optical components by replication, such as diffraction networks having in particular:

high fidelity profile reproduction even for profiles with a high aspect ratio of for example 0.2 to 1 (0.2<r<1);

transmission in the spectral range of the ultraviolet to the near-infrared;

having high diffraction efficiency, for example greater than 90%, and exceptional resistance to intense laser flows, for example greater than 25 $J/cm^2$ at 1053 nm and greater than 12 $J/cm^2$ at 351 nm in nanosecond impulse operation.

The method of the invention is moreover easily transposable to large-size substrates likely to be used for power lasers for example.

The method of the invention may also be applied to the preparation of phase modulation components called "phase plates" which have a phase modulation profile which modifies the incident wave phase.

The release agent is preferably chosen from among the fluoroalkylalkoxysilanes and the fluoroalkylchlorosilanes.

One particularly preferred release agent is (tridecafluoro-1,1,2,2-tetrahydrooctyl)-1-trichlorosilane.

The release agent is applied to the cleaned matrix preferably using the dip coating technique which generally ensures more uniform depositing.

The heat treatment of the matrix coated with the release agent is generally conducted at a temperature of 100 to 200° C. for 5 to 30 minutes.

The adhesion promoter or coupling agent is preferably chosen from among the fluoroalkylalkoxysilanes and the epoxyalkylalkoxysilanes.

It will be noted that the adhesion promoter or coupling agent may be chosen from among the fluoroalkylalkoxysilanes as is the case for the release agent, but it is preferably used with no catalyst (acid, base) in the preparation.

One particularly preferred adhesion promoter is 1H,1H,2H,2H-perfluorodecyltriethoxysilane.

The adhesion promoter or coupling agent is preferably applied using the dip coating technique or by spin coating.

The heat treatment of the substrate of the copy carrier coated with adhesion promoter or coupling agent is generally conducted at a temperature of 100 to 200° C. for a time interval of 5 to 30 minutes.

The copy material is preferably chosen from among the fluorine-containing polymers, vinyl polymers, and materials produced by sol-gel synthesis.

The fluorine-containing polymers are preferably thermoplastic organofluorine polymers preferably chosen from among the homopolymers and copolymers derived from polymerization of a perfluoroalkene (the alkene preferably having 2 to 10 carbon atoms) or from the copolymerization of a perfluoroalkene with another monomer, preferably a perfluorine monomer, and further preferably a monomer of perfluorodioxole type.

The preferred homopolymers and copolymers are homopolymers in which the perfluoroalkene is tetrafluoroethylene and the other fluorine monomer is a perfluorodioxole.

The further preferred copolymers are Teflon AF® made by Du Pont de Nemours which are derived from the copolymerization of a mixture of tetrafluoroethylene (TFE) and 2,2-bistrifluoromethyl 4,5-difluoro 1,3-dioxole (PDD).

The fluorine-containing polymer may also be chosen from among the organofluorocycloether polymers.

The vinyl polymers are preferably chosen from among the polyvinylpyrrolidones, polyvinyl alcohols and polyvinylbutyrals.

The material produced by sol-gel synthesis is generally an oxide-containing material chosen from among the oxides of metals and metalloids and mixtures of these oxides.

The copy material produced by sol-gel synthesis is a material which may be chosen from among polymeric, oligomeric, colloidal and composite materials.

Preferably, this copy material is polymeric, oligomeric or composite silica.

The heat treatment undergone by said matrix or said substrate is generally conducted at a temperature of 100 to 350° C. for a time interval of 15 to 60 minutes.

The embossing temperature is preferably 100 to 350° C.

The pressure for embossing is generally 1 MPa to 50 MPa and is generally applied for a time interval of 1 to 15 minutes.

The invention also concerns the optical component which may be obtained with the above-described method.

This component is preferably chosen from among diffractive optical components, such as diffraction networks, phase modulation components, and objects or components having surface relief.

With the method of the invention, it is possible in particular to prepare by replication, with high fidelity, diffraction networks of large size, that is to say for example of 440 mm side length and/or having high resistance to power laser flow.

Other characteristics and advantages of the invention will be better understood on reading the following description which is given for illustrative purposes and is non-restrictive.

The method of the invention firstly involves the preparation of a master or matrix.

This master or matrix is fabricated prior to the replication method properly so-called which is the subject of the present invention.

The matrix may be in any suitable material, preferably inorganic or organic, for example the matrix may be in a vitreous material such as glass, for example silica-containing glass such as quartz glass, borosilicate glass, lime soda glass or phosphate glass or further the matrix may be in a metal or organic material, such as a resin.

However, the matrix is generally obtained by etching a glass substrate, in particular in molten silica for a laser application, in which the desired profile is hollowed out.

French patent application n° 96 11378 gives examples of etching profiles for diffraction networks.

Etching may be performed for example using a microlithography method based on chemical and/or physical attack of the substrate, for example by acid attack, RIE or RIBE electron or ion bombardment or laser write.

Therefore, the preparation of a matrix generally comprises a depositing step of a recording material, an exposure step during which the holographic recording of the interference figure is made, a development step during which non-exposed material is chemically removed, and finally an etching step, of the diffraction profile for example, in the substrate which is preferably in silica.

The method of the invention uses a cleaned matrix, since, once the matrix is prepared, the application requires surface preparation which essentially consists of its cleaning.

The matrix is generally cleaned in vapour phase under the downflow of a suitable liquid brought to boiling point, chosen for example from among perfluorine liquids, "freons" and their substitution products such as the product marketed under the trade name CFT 130 by ATEC®.

In the same manner, the substrate of the copy carrier is cleaned for example by rubbing its surface with a scaling aqueous solution such as a solution of hydrofluoric acid or diluted soda, followed by a detergent.

The substrate of the copy carrier is in a material generally chosen from among silicate glasses.

According to the method of the invention, and firstly to treat the matrix, a release agent is applied to the cleaned matrix using a liquid phase depositing technique.

The liquid phase depositing technique may be any known liquid phase depositing technique such as for example dip coating, spin coating, laminar flow coating, tape coating or spray coating.

The dip coating technique is preferably used as it generally ensures better deposit uniformity in relation to the orientation of the profile to be copied.

The release agent, whose function is to facilitate the matrix-copy separating operation, is preferably chosen from among the fluoro-alkylalkoxysilanes and the fluoroalkylchlorosilanes, for example (tridecafluoro-1,1,2,2-tetrahydrooctyl)-1-trichlorosilane.

The release agent is generally applied in the form of a solution in a suitable solvent, this solvent generally being chosen from among the alcohols, whether primary, secondary or tertiary alcohols, perfluorine solvents, and chlorofluoroalkanes (freons).

The alcohols are preferably chosen from among linear or branched aliphatic alcohols with 1 to 5 carbon atoms.

The perfluorine solvents are preferably chosen from among the perfluoroalkylamines such as the compounds marketed under the trade name Fluorinert® FC series by 3M, perfluoroethers such as the compounds marketed under the trade name Galden® HT series by Ausimont-Montedison, and the perfluoroalkanes.

The "freons" are preferably chosen from among the compounds marketed under the trade name Flutec® by Rhône-Poulenc, or the trade name CFT® produced by ATEC.

The concentration of the release agent in the solution is generally 0.1 to 2% by mass, that is to say that it is preferably a diluted solution.

Preferably, the solution used as release agent is a 1% solution by mass of (tridecafluoro-1,1,2,2-tetrahydrooctyl)-1, trichlorosilane (marketed by HULS®, for example, in the compound having the formula:

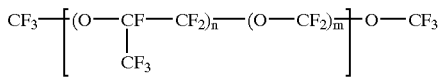

as solvent, the latter compound being marketed under the trade name Galden® HT 110 by Ausimont-Montedison®.

The thickness of the coating of release agent is generally 1 to 20 nanometers.

Still in respect of matrix treatment, the matrix coated with the release agent is then subjected to heat treatment to promote grafting after depositing.

Heat treatment is generally conducted at a temperature of between 100 and 200° C., preferably at 150° C. for a time interval of 5 to 30 minutes, preferably 15 minutes.

According to the method of the invention and secondly (that is to say separately from matrix treatment) and in order to prepare a copy carrier:
an adhesion promoter or coupling agent is applied to a cleaned substrate using a liquid phase depositing technique.

The purpose of this adhesion promoter or coupling agent is to facilitate clinging of the replicated material to its carrier.

The liquid phase depositing technique used is generally chosen from among the techniques already mentioned above, preferably the dip-coating technique or spin coating is chosen.

The adhesion promoter or coupling agent is preferably chosen from among the fluoroalkylalkoxysilanes and the epoxyalkylalkoxysilanes.

The adhesion promoter is generally applied in the form of a solution in a suitable solvent, this solvent generally being chosen from among the alcohols, and perfluorine solvents, preferably linear or branched aliphatic alcohols with 1 to 5 carbon atoms, such as butanol-1.

The concentration of the coupling agent or adhesion promoter is generally between 0.5 and 3% by mass, that is to say that it is preferably a diluted solution.

Preferably, a 2% solution by mass of 1H,1H,2H,2H-perfluorodecyltriethoxysilane is used, in butanol-1.

The thickness of the coating of the coupling agent or adhesion promoter is generally from 1 to 20 nm.

Still as part of the preparation of the copy carrier, the substrate coated with the adhesion promoter or coupling agent is then subjected to heat treatment in order to promote grafting after depositing.

Heat treatment is generally conducted at a temperature of 100 to 200° C., preferably 150° C., for a time interval of 5 to 30 minutes, preferably 15 minutes.

According to the method of the invention, and in order to complete either the treatment of the matrix or the preparation of the copy carrier, a liquid phase depositing technique is used to apply a copy material, also called profiling or embossing material, either to said heat treated matrix coated with release agent as described above, or to said heat treated substrate coated with adhesion promoter or coupling agent as described above.

This copy material application step, whether onto said matrix or said substrate, is conducted under the same conditions.

In the first case, or first variant of the method of the invention, the method will be rather called a casting replication method, and in the second case, or second variant of the method of the invention, the method will be rather called an embossing replication method.

That is to say that if the material to be replicated is on the matrix, the term "casting" is used, and if the material to be replicated is on the carrier, the term "embossing" will be used.

It is to be noted, as can be clearly seen in the foregoing and following description of the invention, that the two variants of the method are similar in their essential steps, and only differ slightly in the carrier or substrate on which the copy material is applied—moreover under the same conditions.

The liquid phase depositing technique used to deposit the copy material is generally chosen from among the techniques already mentioned above, preferably dip coating or spin coating is used.

The copy material is generally chosen from among the materials suitable for the fabrication of optical components.

Within the scope of the preferred application of the invention in particular, that is to say for the fabrication of diffractive optical components such as diffraction networks, this material is preferably a highly transparent material in the region of the ultraviolet (250 to 400 nm), visible (400 to 800 nm) or near-infrared (800–2000 nm) wavelengths, and preferably having resistance to high laser flow, that is to say generally greater than 12 J/cm$^2$ at 351 nm with 3 ns impulse time, or greater than 25 J/cm$^2$ at 1053 nm with 3 ns impulse time.

For the preparation of other optical components, the material shall have properties adapted to the constraints involved for such components, but at all events the method of the invention makes it possible to achieve accurate replication while maintaining the integral required properties of the material.

The copy material is therefore generally chosen from among the fluorine-containing polymers, preferably thermoplastic organofluorine polymers, vinyl polymers, and materials produced by sol-gel synthesis.

The thermoplastic organofluorine polymers are preferably chosen from among the homopolymers and copolymers, preferably amorphous, derived from homolymerization of a perfluorosilane or the copolymerisation of a perfluoroalkene such as tetrafluoroethylene, with another monomer, preferably a perfluorine monomer such as a perfluorodioxole.

Examples of such polymers and copolymers are the products marketed under the general trade name Teflon®, such as Teflon® AF by Du Pont de Nemours.

Teflon AF® products are derived from copolymerization of a mixture of tetrafluoroethylene (TFE) and 2,2-bistrifluoromethyl 4,5-difluoro 1,3-dioxole (PDD).

More precisely, Teflon AF® 1600 is preferred which has a Tg of 160° C.

Another example of said organofluorine polymer is of soluble organofluorocycloether polymer type, marketed by the ASAHI GLASS COMPANY under the trade name CYTOP®, having the formula:

The vinyl polymers are preferably chosen from among the polyvinylpyrrolidones (PVP), polyvinyl alcohols and polyvinylbutyrals.

The materials produced by sol-gel synthesis which form the copy material are generally materials containing oxides chosen from among metal and metalloid oxides and mixtures of these oxides.

Among the metal or metalloid oxides, mention may be made for example of titanium oxide, tantalum oxide, yttrium oxide, scandium oxide, zirconium oxide, hafnium oxide, thorium oxide, niobium oxide, lanthanum oxide, aluminium oxide, zirconium oxide and silicon oxide.

By sol-gel synthesis is meant any of the methods known to persons skilled in the art under the name "sol-gel" process, in which the sol-gel material (that is to say the material produced by sol-gel synthesis) containing metal or metalloid oxide is generally prepared by hydrolysis-condensation of precursor compounds, for example organo-metallic precursor compounds such as alkoxides, or metal salts such as chlorides, nitrates or others . . .

As a general rule, sol-gel methods may be globally classified—but without any limitation—into two categories: namely the polymeric methods or systems and secondly the colloidal methods or systems.

The copy material produced by sol-gel synthesis will therefore be called a polymeric or oligomeric material for example, or further a colloidal or composite material; it may be a material containing any of the metal and metalloid oxides and their mixtures described above.

One preferred material is so-called "polymeric silica" or the silica called "oligomeric silica".

Said silica is prepared using one of the four following types of treatment solutions:

polymeric $SiO_2$ in HCl medium prepared from a mother solution having a $SiO_2$ concentration of 10.6%, a molar ratio $[H_2O]/[SiO_2]$ of 10, a pH close to 2, matured for one month and diluted until a $SiO_2$ concentration of 3.75% is reached;

polymeric $SiO_2$ in $HNO_3$ medium prepared under the same conditions as above; and $SiO_2$ prepared under the conditions described by S. MAEKAWA and T. OHISHI in J. of Non-Crystalline Solids, 169, 1994, p. 207 ($[SiO_2]$=2.4%, $[H_2O]/[SiO_2]$= 12 and pH≈2, overnight shaking, but without UV exposure of the solution contrary to the publication).

It is to be noted that the use of $SiO_2$ prepared with a mixture of tetraethoxysilane in an ethanol medium with a solution of HCl acid catalyst such as $[SiO_2]$=2.4%, $[H_2O]/[SiO_2]$=2.4%, $[H_2O]/[SiO_2]$=12 and pH≈2 after overnight shaking again without UV exposure is equivalent to the preceding preparation.

The two latter preparations are called "oligomeric silica".

A further type of copy material produced by sol-gel synthesis is a composite material containing colloids of metal oxide, preferably silica, coated in a binder, preferably a siloxane binder, such material being called for example "composite silica".

As already indicated above, the copy material chosen is relative to the optical component it is desired to obtain, and in particular to the wavelength region in which it is to be used.

Therefore, among the three families of copy materials cited above, organofluorine polymers are preferably used for an application in a wide spectral region ranging from the ultraviolet to the near-infrared, having regard to their excellent optical properties and resistance to laser flow over this entire range, whereas sol-gel or vinyl materials are more intended for use in the visible or near-infrared.

Concerning organofluorine polymers and vinyl polymers, the copy material is generally applied in the form of a solution in a suitable solvent; this solvent is generally chosen from among alcohols, perfluorine solvents and chlorofluoroalkanes (freons).

These solvents have already been described in detail above in respect of the application of the release agent.

The concentration of the organofluorine polymer or vinyl polymer copy material in the solution is generally from 1 to 12% by mass, preferably 6% by mass.

Preferably, as copy material, for the replication of a diffraction network operating in the ultraviolet, TEFLON AF® 1600 mentioned above is used, whose glass transition temperature is 160° C.

This copy material is diluted either in FC 75® solvent marketed by 3M which is a perfluoroalkylamine, or in Galden® HT110 marketed by Ausimont to a proportion of 1 to 12% by mass, preferably 6%.

The depositing conditions may be easily determined relative to the thickness of the deposited film which is generally from 0.1 to 5 μm, and which is for example controlled in relation to the depth of the profile to be copied.

For example, with a 6% by mass solution of Teflon AF®, a thickness of 0.7 μm is applied in a single spin-coating operation at the rate of 700 rev/minute.

Also, the depositing conditions for copy materials produced by sol-gel synthesis may be easily determined relative to the thickness of the deposited coating or film, which is generally between 0.1 and 5 μm.

If a coating of substantial thickness is deposited, for example of 1 to 5 μm, it can be deposited not in one but in several depositing steps, that is to say 2 to 10 steps, each time with the depositing of a layer of copy material having a thickness of 0.5 to 2 μm.

According to the invention, said matrix or said substrate thus coated with copy material is subjected to heat treatment in order to promote grafting after depositing.

Heat treatment is generally conducted at a temperature of 100 to 350° C., preferably 250° C., for a period of 15 to 60 minutes, preferably 30 minutes.

In the event that the copy material is a vinyl or organofluorine polymer, the treatment temperature is generally greater than the Tg (glass transition temperature) of said polymer which is for example 250° C. for Teflon AF® 1600.

If the coating of copy material as indicated above is of substantial thickness for example 1 to 5 μm, that is to say in the event that this coating is applied, or deposited, in several depositing steps ("multidepositing") in which a layer of copy material is deposited each time, an intermediate treatment is preferably performed after each depositing step, at a temperature of 100 to 250° C., preferably 150° C., for a time interval of 5 to 30 minutes, preferably 15 minutes.

It is possible, however to conduct the heat treatment on the entire deposited coating after all the depositing steps.

According to the invention, and prior to the embossing step, the matrix so treated and the copy basis so prepared are brought to embossing temperature separately as described above.

In other words, the matrix and the copy carrier, properly prepared, must be heated separately.

The two elements are therefore brought in separate parts to the minimum embossing temperature which is generally between 100 and 350° C., preferably 250° C.

In the event that the copy material is a vinyl or organofluorine polymer, this embossing temperature is generally greater than the Tg of said polymer, for example this embossing temperature is greater than 250° C. for Teflon AF® 1600.

According to the invention, the matrix and copy carrier are then assembled, this assembly of the two parts being made for example by mechanical assembly.

The matrix is then embossed onto the copy carrier (Variant 1: replication method by embossing), or the copy carrier is embossed onto the matrix (Variant 2: replication method by casting).

This embossing is made for example using a purely mechanical method, a hydraulic method or a pneumatic method.

Maintaining the temperature of the elements and their embossing must generally be performed simultaneously to ensure accurate reproduction.

The above-mentioned temperature and pressure of the assembly are maintained for sufficient time to ensure replication.

The embossing pressure is generally 1 MPa to 50 MPa and is applied for a time interval of 1 to 15 minutes.

Preferably, for Teflon AF® 1600, a hydraulic press is used for example a Hydromat® at a pressure of 10 MPa for 5 minutes.

The heating system is then switched off and the temperature of the matrix and copy assembly undergo a temperature drop through inert cooling.

At the same time, the pressure is maintained until return to ambient temperature.

The replicated copy is then uncoupled from the matrix during the release operation.

This operation, consisting of separating the copy carrier from the matrix, is generally performed without any particular assistance, at ambient temperature or possibly under heat, for example at a temperature of 50 to 200° C., but at all events at a temperature lower than the Tg of the polymer possibly forming the copy material.

The following examples, given for illustrative purposes and which are in no way restrictive, illustrate the method of the invention.

EXAMPLE 1

Using the method of the invention (variant of replication by embossing) the replicated copy of a diffraction network at 351 nm is prepared, comprising 2497 lines/mm and having the depth and filling rate given in table I below.

The conditions of the method are generally those described above with the following particularities:

Matrix Treatment

Matrix: silica

Release agent: (tridecafluoro-1,1,2,2-tetrahydrooctyl)-1, trichlorosilane supplied by HULS®, applied by dip coating with a withdrawal rate of 5 cm/min, in the form of a 1% by mass solution in the solvent Galden® HT 110;

Heat treatment of the matrix coated with release agent: 150° C. for 15 minutes (oven heating).

Preparation of the Copy Carrier

Substrate: silica

Adhesion promoter: 1H, 1H, 2H, 2H-perfluoro-decyltriethoxysilane supplied by PCR® Inc., applied by spin-coating at 700 rev/min in the form of a 2% by mass solution in butanol-1;

Heat treatment of the substrate: 150° C. for 15 minutes (oven heating);

Copy material: Teflon AF® 1600;

Application of the copy material in a single deposit by spin coating at the rate of 700 rev/min in the form of a 6% by mass solution in the solvent Galden® HT 110.

Thickness of the deposit: 1 $\mu$m

Heat treatment of the substrate coated with copy material: 250° C. for 30 minutes.

Bringing the matrix and copy carrier to the desired temperature: this is conducted using a heating cable and the minimum embossing temperature is 270° C.

Embossing

Embossing is conducted in a HYDROMAT® hydraulic press at a pressure of 10 MPa, at 270° C. for 5 minutes.

The characteristics of the replicated copy in TEFLON® of the network obtained (depth, filling rate) are given in table I.

EXAMPLE 2

Using the method of the invention, the replicated copy is prepared of a diffraction network at 1053 nm comprising 802 lines per mm and having the depth and filling rate given in table I.

The conditions of the method are the same as those for example 1 above.

The characteristics of the replicated copy in TEFLON® of the network obtained are given in table I.

TABLE I

| EXAMPLE | NETWORKS | METHOD | ELEMENT | Depth (mm) | Filling rate |
|---|---|---|---|---|---|
| 1 | at 351 nm | 10 MPa | silica matrix | 0.67 | 0.4 |
|  | (2497 lines/mm) | 270° C. | Teflon copy | 0.66 | 0.6 |
| 2 | at 1053 nm | 10 MPa | silica matrix | 1.95 | 0.4 |
|  | (802 lines/mm) | 270° C. | Teflon copy | 1.95 | 0.6 |

The experimental data in table I show the accuracy of replication using the method of the invention.

In particular, it can be seen that the depths obtained are equivalent and that filling rate of the matrix and corresponding replica are complementary.

EXAMPLE 3

Using the method of the invention (embossing) the replicated copy in Teflon AR® of a diffraction network is prepared, whose matrix is etched at 150 lines/mm, the lines having a depth of 1.97 $\mu$m.

The matrix and the copy were observed under a tunnelling microscope, and it was found that the profile was fully preserved.

What is claimed is:

1. Method of fabricating an optical component by replication using a matrix in which, firstly and in order to treat the matrix:

a release agent is applied to the cleaned matrix using a liquid phase depositing technique;

the matrix coated with the release agent is subjected to heat treatment; and secondly, and in order to prepare a copy carrier:

an adhesion promoter or coupling agent is applied to a cleaned substrate using a liquid phase depositing technique, the substrate coated with the adhesion promoter or coupling agent is subjected to heat treatment;

in order to complete either the treatment of the matrix or the preparation of the copy carrier, a copy material is applied using a liquid phase depositing technique either to said heat-treated matrix coated with release agent, or to said heat treated substrate coated with adhesion promoter or coupling agent, and said matrix and said substrate coated with copy material are subjected to heat treatment;

the matrix so treated and the copy carrier so prepared are brought separately to embossing temperature;

the matrix and the copy carrier are assembled, and either the matrix is embossed onto the copy carrier, or the copy carrier is embossed onto the matrix;

the assembly temperature and pressure are maintained for sufficient time to ensure replication;

after cooling, the copy carrier carrying the replicated optical component is separated from the matrix.

2. Method according to claim 1, in which the release agent is selected from the group consisting of a fluoroalkylalkoxysilane and a fluoroalkylchlorosilane.

3. Method according to claim 2, in which the release agent is (tridecafluoro-1,1,2,2-tetrahydrooctyl)-1-trichlorosilane.

4. Method according to claim 1, in which the release agent is applied by dip coating.

5. Method according to claim 1, in which the heat treatment of the matrix coated with release agent is conducted at a temperature of 100 to 200° C. for a time interval of 5 to 30 minutes.

6. Method according to claim 1, in which the coupling agent or adhesion promoter is selected from the group consisting of a fluoroalkylalkoxysilane, and an epoxyalkylalkoxysilane.

7. Method according to claim 6, in which the coupling agent or adhesion promoter is 1H, 1H, 2H, 2H-perfluorodecyl triethoxysilane.

8. Method according to claim 1, in which the adhesion promoter or coupling agent is applied by dip-coating or spin coating.

9. Method according to claim 1, in which the heat treatment of the substrate coated with adhesion promoter or coupling agent is conducted at a temperature of 100 to 200° C. for a time interval of 5 to 30 minutes.

10. Method according to claim 1, in which the copy material is selected from the group consisting of a fluorine-containing polymer, a vinyl polymer, and a material produced by sol-gel synthesis.

11. Method according to claim 10, in which said fluorine-containing polymer is selected from the group consisting of a homopolymer; a copolymer derived from polymerization of a perfluoroalkene; a copolymer derived from the copolymerization of perfluoroalkene with another perfluorine monomer; and a polymer of an organofluorocycloether.

12. Method according to claim 11, in which said perfluoroalkene is tetrafluoroethylene and said another perfluorine monomer is a perfluorodioxole.

13. Method according to claim 12, in which the copolymers are derived from the copolymerization of a mixture of tetrafluoroethylene and 2,2-bistrifluoromethyl 4,5-difluoro 1,3-dioxole.

14. Method according to claim 10, in which the vinyl polymer is selected from the group consisting of a polyvinylpyrrolidone, a polyvinyl alcohol and a polyvinylbutyral.

15. Method according to claim 10, in which said material produced by sol-gel synthesis is selected from a material containing an oxide selected from the group consisting of a metal oxide, a metalloid oxide and a mixture of these oxides.

16. Method according to claim 10, in which said material produced by sol-gel synthesis is selected from the group consisting of a polymeric, an oligomeric, a colloidal and a composite material.

17. Method according to claim 16, in which said copy material is polymeric, oligomeric, or composite silica.

18. Method according to claim 1, in which the heat treatment of the matrix or substrate coated with copy material is conducted at a temperature of 100 to 350° C. for a time interval of 15 to 60 minutes.

19. Method according to claim 1, in which embossing is conducted at a temperature of 100 to 350° C. and at a pressure of 1 MPa to 50 MPa for a time interval of 1 to 15 minutes.

* * * * *